US009873978B2

(12) United States Patent
Maeda et al.

(10) Patent No.: US 9,873,978 B2
(45) Date of Patent: Jan. 23, 2018

(54) HYBRID-TYPE POLYESTER RESIN, RESIN COMPOSITION FOR FORMATION OF FILM, AND POLYESTER FILM AND TEXTILE

(75) Inventors: Koji Maeda, Kyoto (JP); Yusuke Numamoto, Osaka (JP)

(73) Assignee: GOO CHEMICAL CO., LTD., Kyoto (JP)

( * ) Notice: Subject to any disclaimer, the term of this patent is extended or adjusted under 35 U.S.C. 154(b) by 1219 days.

(21) Appl. No.: 13/505,277

(22) PCT Filed: Oct. 28, 2010

(86) PCT No.: PCT/JP2010/069158
§ 371 (c)(1),
(2), (4) Date: Jun. 26, 2012

(87) PCT Pub. No.: WO2011/052677
PCT Pub. Date: May 5, 2011

(65) Prior Publication Data
US 2012/0277381 A1  Nov. 1, 2012

(30) Foreign Application Priority Data

Nov. 2, 2009  (JP) .................................. 2009-252225

(51) Int. Cl.
C08G 63/91 (2006.01)
D06M 15/507 (2006.01)
C08G 63/695 (2006.01)
C09D 5/18 (2006.01)
C08G 77/04 (2006.01)

(52) U.S. Cl.
CPC ....... D06M 15/507 (2013.01); C08G 63/6954 (2013.01); C08G 63/914 (2013.01); C09D 5/18 (2013.01); C08G 77/04 (2013.01); D06M 2200/30 (2013.01)

(58) Field of Classification Search
CPC .................................................. C08G 63/914
See application file for complete search history.

(56) References Cited

U.S. PATENT DOCUMENTS 6,287,639 B1 * 9/2001 Schmidt ................ C03C 17/007
427/387
7,358,323 B2 4/2008 Maeda et al.
8,039,539 B2 * 10/2011 Pfeiffer et al. ................ 524/493
2005/0261461 A1 * 11/2005 Maeda et al. .................. 528/272
2009/0124733 A1 5/2009 Haruhara et al.
2010/0184907 A1 * 7/2010 Preiffer et al. ................ 524/506
2010/0189993 A1 7/2010 Mori et al.
2012/0038989 A1 * 2/2012 Louarn ................... G02B 1/111
359/580

FOREIGN PATENT DOCUMENTS

| JP | 6-16796 A | 1/1994 |
|---|---|---|
| JP | 6-16796 U | 3/1994 |
| JP | 2000-15695 A | 1/2000 |
| JP | 2001-139784 A | 5/2001 |
| JP | 2001-163962 A | 6/2001 |
| JP | 2004-67910 A | 3/2004 |
| JP | 2005-179439 A | 7/2005 |
| JP | 2005-226043 A | 8/2005 |
| JP | 2006-16560 A | 1/2006 |
| JP | 2007-31710 A | 2/2007 |
| WO | WO 2009003804 A1 * | 1/2009 |
| WO | WO 2010034936 A1 * | 4/2010 ............ G02B 1/111 |

OTHER PUBLICATIONS

Lambert, A. A., III; Mauritz, K. A.; Schiraldi, D. A. J. Appl. Polym. Sci. 2002, 84, 1749. Wiley Periodicals, Inc.*
Notification of Reasons for Refusal for the Application No. 2011-588477 from Japan Patent Office dated Jun. 24, 2014.
International Search Report for the Application No. PCT/JP2010/069158 dated Dec. 21, 2010.
Wang, Hai-fung, "The Preparation and Research of Raw Materials for the High-Transparent Polyester Film", Beijing Institute of Clothing Technology, Dec. 2008, pp. 25-27, 34, and 38.

* cited by examiner

Primary Examiner — Michael Pepitone
(74) Attorney, Agent, or Firm — Cheng Law Group, PLLC

(57) ABSTRACT

Provided is a hybrid-type polyester resin which, when used in processing a base material such as textile or PET film, can impart excellent flame retardance to the base material. The hybrid-type polyester resin can be inhibited from scattering high-temperature drips, even if the hybrid-type polyester resin burns. The hybrid-type polyester resin comprises both a polyester resin and a siloxane prepared from silica and an alkoxysilane. Therefore, the hybrid-type polyester resin retains the excellent properties inherent in polyester resin and exhibits extremely excellent flame retardance by virtue of hybridization with the siloxane. Even if the hybrid-type polyester resin burns, the hybrid-type polyester resin is less susceptible to deformation, and is therefore inhibited from scattering high-temperature drips.

6 Claims, No Drawings

HYBRID-TYPE POLYESTER RESIN, RESIN COMPOSITION FOR FORMATION OF FILM, AND POLYESTER FILM AND TEXTILE

CROSS REFERENCE TO RELATED APPLICATIONS

The present application claims priority to JP 2009-252225 filed on Nov. 2, 2009, the entire contents of which are hereby incorporated by reference into the present application.

TECHNICAL FIELD

The present invention relates to a hybrid-type polyester resin provided with high burn resistance, to a resin composition for formation of film containing this hybrid-type polyester resin, and to a polyester film and textile processed with this resin composition for formation of film.

BACKGROUND ART

Because of the superior mechanical properties and chemical characteristics for which it is well known, polyester resin is widely used not only for clothing and industrial and other textiles, but also as a base material for magnetic tapes, flexible disks and other magnetic recording materials, as a base material for photographs, electrical insulation, cable wrapping, capacitors, evaporation coatings, adhesive tape, printer ribbons and magnetic cards, for mold release of FRP and the like, in packaging, and in various agricultural and other industrial applications.

Recently, there has been increasing demand for improvements in the burn resistance of synthetic fibers and various plastic products from the standpoint of fire prevention, but conventional polyester resin is unsatisfactory in terms of burn resistance. Therefore, efforts have been made to impart flame retardancy by adding organic halogen compounds, antimony compounds and other flame retardants during polyester manufacture and the like.

One problem with these flame retardants is that they produce toxic gas in contact with flame, and it has therefore been proposed that a hydrated metal compound such as aluminum hydroxide or magnesium hydroxide be added instead, but a large amount must be added in order to impart sufficient flame retardancy, detracting from the excellent properties inherent in polyester resin.

To resolve these problems, methods have been proposed whereby specific phosphorus compounds are added or copolymerized as flame retardants during polyester manufacture (Japanese Patent Application Publication Nos. H6-16796, 2001-139784, 2001-163962).

However, these phosphorus-containing polyester resins have often been hardly soluble in toluene, xylene and other widely-used organic solvents. As a result, an extremely low degree of polymerization has been necessary in order to obtain a solution or dispersion of a phosphorus-containing polyester resin for processing textiles or PET films or the like using these widely-used organic solvents, making it difficult to maintain the inherent properties of the polyester resin. It has thus been necessary to use organic solvents with high solubility such as dioxane, DMF, HFIP, OCP and the like so that such phosphorus-containing polyester resins can be coated as base material processing treatment resins for processing, for example, textiles and PET films while maintaining a high degree of polymerization and preserving the inherent properties of the polyester resin, but although these solvents have high solubility, they have problems in terms of working environment and environmental protection.

To resolve these problems, the applicants in this case have proposed including a reactive phosphorus-containing compound in the reaction system during polyester synthesis (Japanese Patent Application Publication No. 2004-67910). In this way, a polyester resin can be made flame retardant while maintaining the excellent properties inherent in polyester resin.

As thus described polyester resin has been made more flame retardant, but the inventors have continued to make improvements in polyester resin in order to further enhance the flame retardancy of polyester resin for purposes of fire prevention and the like, and to impart additional characteristics to the polyester resin for purposes of fire prevention and the like. The inventors also focused on the scattering of high-temperature droplets from polyester resin after combustion when the polyester resin burns, and conceived the idea that even when polyester resin burns, the damage can be prevented from spreading if such scattering of droplets can be prevented.

DISCLOSURE OF THE INVENTION

In light of these circumstances, it is an object of the present invention to provide a hybrid-type polyester resin that can impart excellent flame retardancy to textiles, PET films and other base materials when used in processing these materials, and that can suppress scattering of high-temperature droplets even when combustion occurs, along with a resin composition for formation of film containing this hybrid-type polyester resin, and a polyester film and textile treated with this resin composition for formation of film.

The hybrid-type polyester resin of the present invention comprises a polyester resin and a siloxane formed from silica and an alkoxysilane. This hybrid-type polyester resin retains the excellent properties inherent in polyester resin and exhibits extremely high flame retardancy by virtue of hybridization with the siloxane. Even if the hybrid-type polyester resin burns, moreover, it is less susceptible to deformation and therefore less likely to scatter high-temperature droplets.

In the present invention, the polyester resin preferably comprises an aqueous polyester resin formed from a polyvalent carboxylic acid component, a glycol component and a hydrophilic component (water-solubility imparting component). This gives the hybrid-type polyester resin the property of dispersing or dissolving in aqueous solvents by virtue of the hydrophilic component (water-solubility imparting component) while retaining the excellent properties inherent in polyester resin, which is highly desirable from the standpoint of ensuring worker safety, environmental protection, ease of processing the base material and the like.

In the hybrid-type polyester resin of the present invention, moreover, the polyester resin preferably comprises a phosphorus-containing polyester resin. This gives the hybrid-type polyester resin even greater flame retardancy while retaining the excellent properties inherent in polyester resin.

Moreover, in the hybrid-type polyester resin of the present invention the phosphorus-containing polyester resin is preferably formed from a polyvalent carboxylic acid component, a glycol component, a hydrophilic component and a reactive phosphorus-containing compound. This gives the hybrid-type polyester resin even greater flame retardancy as well as the property of dispersing or dissolving in aqueous solvents by virtue the hydrophilic component, while retaining the excellent properties inherent in polyester resin.

The hybrid-type polyester resin of the present invention preferably also contains a phosphorus-based flame retardant. This imparts even greater flame retardancy to the hybrid-type polyester resin.

The resin composition for formation of film of the present invention preferably contains the aforementioned hybrid-type polyester resin. Thus, while retaining the excellent properties inherent in polyester resin, this resin composition for formation of film has improved flame retardancy, is resistant to deformation during combustion, and is less likely to scatter droplets at high temperatures.

This resin composition for formation of film is preferably a composition to use for surface-processing of a polyester film. The surface of a polyester film that is surface-treated with this resin composition for formation of film thereby acquires excellent flame retardancy, and resistance to scattering of high-temperature droplets during combustion.

This resin composition for formation of film is preferably a composition for textile processing. A textile that is processed with the resin composition for formation of film thereby acquires excellent flame retardancy and resistance to scattering of high-temperature droplets during combustion.

A polyester film of the present invention is preferably one that has been surface-treated with the aforementioned resin composition for formation of film. This polyester film thereby acquires excellent flame retardancy and resistance to scattering of high-temperature droplets during combustion.

A textile of the present invention is preferably one that has been treated with the aforementioned resin composition for formation of film. This textile thereby acquires excellent flame retardancy and resistance to scattering of high-temperature droplets during combustion.

BEST MODE FOR CARRYING OUT THE INVENTION

Embodiments of the present invention are explained below.

The hybrid-type polyester resin is manufactured via a step in which a reaction solution containing a polyester resin, silica particles and an alkoxysilane is reacted by the sol-gel method.

The polyester resin is obtained via a step in which a polyvalent carboxylic acid component and a glycol component as raw materials are reacted and condensed or polycondensed.

The polyvalent carboxylic acid component consists of one or more compounds selected from the bivalent and higher polyvalent carboxylic acids and anhydrides, esters, acid chlorides, halides and other derivatives of these polyvalent carboxylic acids that react with the glycol component described below to form esters (ester-forming derivatives of polyvalent carboxylic acids).

Examples of the polyvalent carboxylic acid include aromatic dicarboxylic acids, aliphatic dicarboxylic acids and other dicarboxylic acids. Examples of aromatic dicarboxylic acids include terephthalic acid, isophthalic acid, phthalic acid, diphenic acid, naphthalic acid, 1,2-napthalenedicarboxylic acid, 1,4-napthalenedicarboxylic acid, 1,5-napthalenedicarboxylic acid and 2,6-napthalenedicarboxylic acid. Examples of aliphatic dicarboxylic acids include linear, branched and cyclic oxalic acid, malonic acid, succinic acid, maleic acid, itaconic acid, glutaric acid, adipic acid, pimelic acid, 2,2-dimethylglutaric acid, suberic acid, azelaic acid, sebacic acid, dodecanedioic acid, 1,3-cyclopentanedicarboxylic acid, 1,4-cyclohexanedicarboxylic acid, diglycolic acid, thiodipropionic acid and the like.

Each of these polyvalent carboxylic acids and ester-forming derivatives thereof may be used alone, or multiple kinds may be used together. Of these polyvalent carboxylic acids and ester-forming derivatives thereof, terephthalic acid, isophthalic acid, 2,6-naphthalenedicarboxylic acid and other aromatic dicarboxylic acids and succinic acid, adipic acid, sebacic acid, dodecanedioic acid and other aliphatic dicarboxylic acids can be used by preference from the standpoint of ease of the reaction and weather resistance, durability and the like of the resulting resin. Optimally, an aromatic dicarboxylic acid is used alone as the polyvalent carboxylic acid component, or as the principal component of the polyvalent carboxylic acid component.

Glycol components include not only glycols but also diacetate compounds corresponding to glycols, and other glycol derivatives that form esters by reacting with the polyvalent carboxylic acid component (glycol ester-forming derivatives).

Examples of such glycols include ethylene glycol and diethylene glycol, triethylene glycol, tetraethylene glycol, pentaethylene glycol, hexaethylene glycol, heptaethylene glycol, octaethylene glycol and other polyethylene glycols, propylene glycol and dipropylene glycol, tripropylene glycol, tetrapropylene glycol and other polypropylene glycols, and 1,3-propanediol, 1,3-butanediol, 1,4-butanediol, 1,5-pentanediol, 1,6-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-dihydroxybiphenol, 4,4'-methylenediphenol, 4,4'-isopropylidenediphenol, 1,5-dihydroxynaphthaline, 2,5-dihydroxynapthaline, 2,2-bis(4-hydroxyphenyl)propane (bisphenol A), bisphenol S and the like. Each of these glycols and ester-forming derivatives thereof may be used alone, or multiple kinds may be used together.

Of these glycols and ester-forming derivatives thereof, particularly ethylene glycol, diethylene glycol, 1,4-butanediol and other butanediols, 1,6-hexanediol and other hexanediols, 1,4-cyclohexanedimethanols, and neopentyl glycol and bisphenol A and the like can be used by preference from the standpoint of ease of the reaction and durability and the like of the resulting resin.

The raw materials of the polyester resin preferably also include a hydrophilic component (water-solubility imparting component). The hydrophilic component reacts with the other raw materials to constitute part of the skeletal structure of the polyester resin, thereby introducing ionic polar groups derived from the hydrophilic component into the skeleton of the polyester resin and imparting hydrophilicity to the polyester resin. It is thereby possible to make the polyester resin aqueous and capable of being dispersed or dissolved in aqueous solvents.

A component corresponding to either the polyvalent carboxylic acid component or glycol component may also be used as a hydrophilic component (water-solubility imparting component). Examples of hydrophilic components corresponding to polyvalent carboxylic acid components include dicarboxylic acids having metal sulfonate groups, tribasic acid anhydrides, tetrabasic acid anhydrides and other trivalent and higher polyvalent carboxylic acids, and ester forming derivatives of these and the like.

Of these hydrophilic components, examples of dicarboxylic acids having metal sulfonate groups and ester-forming derivatives thereof (hereunder generally called dicarboxylic acids having metal sulfonate groups and the like) include 5-sulfoisophthalic acid, 2-sulfoisophthalic acid, 4-sulfoisophthalic acid, sulfoterephthalic acid, 4-sulfonaphthalene-2,6-dicarboxylic acid and other alkali metal salts and esters of these, and acid chlorides, halides and other ester-forming derivatives and the like. For purposes of imparting good water dispersibility or water solubility to the aqueous polyester resin, the aforementioned alkali metal is preferably sodium, potassium or lithium.

When dicarboxylic acids having metal sulfonate groups and the like are used as hydrophilic components, the metal sulfonate groups remain effectively in the polyester resin, imparting superior hydrophilicity to the polyester resin. Using 5-sodium sulfoisophthalic acid or an ester thereof (such as sodium dimethyl 5-sulfonatoisophthalate) in particular, the sodium sulfonate groups remain effectively in the polyester resin, imparting superior hydrophilicity to the polyester resin.

It is also desirable to use trivalent or higher polyvalent carboxylic acids and ester forming derivatives thereof (hereunder generally called trivalent or higher polyvalent carboxylic acids and the like) as hydrophilic components. In this case, when the polyester resin is prepared by a condensation or polycondensation reaction and the reaction is terminated with carboxyl groups derived from the trivalent or higher polyvalent carboxylic acids and the like remaining in the resin framework, the remaining carboxyl groups can be neutralized with a basic compound such as ammonia, alkanolamine or an alkali metal compound to make the polyester resin dispersible or soluble in an aqueous solvent.

Example of such trivalent or higher polyvalent carboxylic acids and the like include hemimellitic acid, trimellitic acid, trimesic acid, mellophanic acid, pyromellitic acid, benzenepentacarboxylic acid, mellitic acid, cyclopropane-1,2,3-tricarboxylic acid, cyclopentane-1,2,3,4-tetracarboxylic acid, ethanetetracarboxylic acid and other polyvalent carboxylic acids, and ester forming derivatives of these. By using trimellitic anhydride, pyromellitic anhydride and ester forming derivatives of these in particular, it is possible to adequately control three-dimensional crosslinking of the polyester resin and effectively retain carboxyl groups in the polyester resin after the polycondensation reaction.

By using at least one such trivalent or higher polyvalent carboxylic acid or the like and particularly a tribasic acid anhydride or tetrabasic acid anhydride or an ester forming derivative thereof as a water solubility imparting component, it is possible to effectively retain carboxyl groups in the aqueous polyester resin and impart excellent hydrophilicity to the polyester resin.

One of the aforementioned trivalent or higher polyvalent carboxylic acids and the like or dicarboxylic acids having metal sulfonate groups and the like can be used as a hydrophilic component, or two or more may be combined.

When using a hydrophilic component corresponding to a polyvalent carboxylic acid component, the amount of the hydrophilic component used is preferably in the range of 1 mol % to 60 mol % of the total polyvalent carboxylic acid component. It is thus possible to impart particularly good hydrophilicity to the polyester resin while also maintaining good resin strength. If the amount used is in the range of 2 mol % to 40 mol % in particular, it is possible to impart especially high flame retardancy, durability and the like to a film formed from a composition for film formation containing the polyester resin.

When a dicarboxylic acid having a metal sulfonate group or the like is used as a hydrophilic component, the amount of the dicarboxylic acid having metal sulfonate groups or the like used is preferably in the range of 1 mol % to 60 mol % of the total polyvalent carboxylic acid component. This makes it possible to improve the resin strength of the polyester resin in particular, to improve the tensile breaking strength and the like, and when this polyester resin is used to prepare a composition for film formation, to impart especially good water resistance and durability on a film formed from the composition for film formation.

In particular, when one or more selected from 5-sodium sulfoisophthalic acid and ester forming derivatives thereof is used as a dicarboxylic acid having metal sulfonate groups, the sodium sulfonate groups can be adequately retained in the polyester resin and excellent water dispersibility or water solubility can be imparted to the polyester resin if the total amount of the 5-sodium sulfoisophthalic acid and ester forming derivatives thereof used is in the range of 1 mol % to 60 mol % of the total polyvalent carboxylic acid component. Particularly excellent effects are obtained if the total amount of the 5-sodium sulfoisophthalic acid and ester forming derivatives thereof used is in the range of 1 mol % to 30 mol %.

When a trivalent or higher polyvalent carboxylic acid or the like is used as a hydrophilic component, the amount of the trivalent or higher polyvalent carboxylic acid or the like used is preferably in the range of 1 mol % to 60 mol % of the total polyvalent carboxylic acid component. In this case, a polyester resin having a sufficient degree of polymerization and water dispersibility or water solubility can be obtained when the polyester resin is manufactured under polymerization conditions that exclude unnecessary crosslinking reactions. When a trivalent or higher polyvalent carboxylic acid or the like is used alone as the hydrophilic component, the amount of the trivalent or higher polyvalent carboxylic acid and the like used is preferably in the range of 5 mol % to 40 mol % of the total polyvalent carboxylic acid component.

When using a trivalent or higher polyvalent carboxylic acid or the like selected from the tribasic salts, tetrabasic salts and ester forming derivatives of these in particular, enough carboxyl groups can be retained in the polyester resin and excellent water dispersibility or water solubility can be imparted to the polyester resin if the total amount of these tribasic acid, tetrabasic acid and ester forming derivatives thereof used is in the range of 1 mol % to 60 mol % of the total polyvalent carboxylic acid component. Especially desirable results are obtained if the total amount of these tribasic salts, tetrabasic salts and ester forming derivatives thereof used is in the range of 1 mol % to 30 mol %.

In this Description, a water-based solvent may be water alone or a mixed solvent comprising water and a hydrophilic solvent. Examples of hydrophilic solvents include methanol, ethanol, 2-propanol and other alcohols, propylene glycol monomethyl ether, ethyl cellosolve, butyl cellosolve and other glycol ethers, and cyclohexanone and the like. In the aforementioned mixed solvent comprising water and a hydrophilic solvent, the ratio of the water and hydrophilic solvent is not particularly limited, but the content of the hydrophilic solvent in the mixed solvent is preferably in the range of 0.1 wt % to 50 wt % considering the stability of the polyester resin solution, the safety of the working environment and the like.

When a trivalent or higher polyvalent carboxylic acid or the like is used for the hydrophilic component, the aqueous polyester resin becomes dispersible or soluble in water-based solvents by being neutralized with a basic compound such as ammonia or alkanolamine for example as discussed above, but the aforementioned still applies even when such means are used.

A reactive phosphorus-containing compound is preferably included in the raw materials of the polyester resin. This reactive phosphorus-containing compound reacts with the other raw materials to constitute part of the skeletal structure of the polyester resin and contribute phosphorus atoms to the skeleton of the polyester resin. This improves the flame retardancy of the polyester resin.

A compound that can react and be condensed or polycondensed with at least one of the aforementioned polyvalent carboxylic acid component and glycol component can be used as this reactive phosphorus-containing compound. Specifically, the reactive phosphorus-containing compound is preferably one having an ester-forming functional group in the molecule.

This ester-forming functional group is a functional group that forms an ester bond by reacting with another carboxyl group or hydroxyl group, and in addition to carboxyl and hydroxyl groups, examples include groups derived from carboxyl groups by anhydridization, esterification, acid chloride formation, halogenation or the like that form ester bonds by reacting with other hydroxyl groups (ester-forming derivative groups of carboxyl groups), and groups derived from hydroxyl groups by acetate formation or the like that form ester bonds by reacting with other carboxyl groups (ester-forming derivative groups of hydroxyl groups). An ester-forming functional group that is a carboxyl or hydroxyl group is particularly desirable for obtaining good reactivity in the manufacturing step.

It is especially desirable for the reactive phosphorus-containing compound to have one or two ester-forming functional groups per molecule. In this case, an aqueous polyester resin having a sufficient degree of polymerization can be obtained when the aqueous polyester resin is manufactured under polymerization conditions that exclude unnecessary crosslinking reactions. When the reactive phosphorus-containing compound has two ester-forming functional groups, moreover, better effects are obtained if both the ester-forming functional groups are carboxyl groups, or if both the ester-forming functional groups are hydroxyl groups.

From the standpoint of ease of the reaction and particularly good flame retardant effects and the like, the compounds represented by General Formulae (I) to (III) below are desirable examples of the aforementioned reactive phosphorus-containing compound. Of these, particularly good weather resistance of the polyester resin and stability and the like of a resin composition for film formation prepared from this polyester resin are obtained using the compound represented by General Formula (I).

[C1]

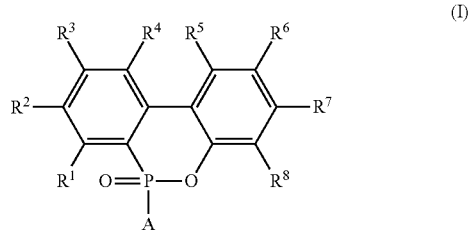

(In the formula, $R^1$ to $R^8$ may be the same or different, and each represents a hydrogen atom or organic group. A represents a hydrogen atom or organic group, and may be the same as $R^1$ to $R^8$ or different. However, at least one of $R^1$ to $R^8$ and A has an ester-forming functional group.)

[C2]

(In the formula, $R^9$ and $R^{10}$ may be the same or different, and each represents a hydrogen atom or organic group. However, at least one of $R^9$ and $R^{10}$ has an ester-forming functional group.)

[C3]

(In the formula, $R^{11}$ to $R^{13}$ may be the same or different, and each represents a hydrogen atom or organic group. However, at least one of $R^{11}$ to $R^{13}$ has an ester-forming functional group.) The compounds represented by General Formulae (I) to (III) preferably have one or two ester-forming functional groups per molecule.

The organic groups in General Formulae (I) to (III) above are selected from suitable substituents without any particular limitations, but univalent organic groups with 1 to 1,000 carbon atoms are preferred. Examples of univalent organic groups include alkyl, alkenyl and other aliphatic hydrocarbon groups, cyclohexyl and other alicyclic hydrocarbon groups, aryl and other aromatic hydrocarbon groups, aralkyl and other hydrocarbon groups, and carboxyl and alkyloxy groups and the like. These groups may also contain functional groups within them. For example, they may have substituents comprising ester forming functional groups (carboxyl groups, hydroxyl groups and ester forming derivative groups derived from these). However, as discussed above, the number of ester-forming functional groups per molecule is preferably one or two.

The compound represented by General Formula (I) above preferably has one or two ester-forming functional groups, and these ester-forming functional groups are preferably located within the organic group A. Of the compounds represented by General Formula (I) above, those in which $R^1$ to $R^8$ are hydrogen atoms and A has one or two hydroxyl groups, carboxyl groups or ester-forming derivative groups derived from these as ester-forming functional groups are especially desirable. This serves to improve reactivity during preparation of the polyester resin, and to provide especially good weather resistance of the resulting polyester resin and stability and the like of a resin composition for film formation prepared from the polyester resin.

Of the reactive phosphorus-containing compounds represented by General Formula (I), the compounds represented by chemical formulae (a) to (e) below are examples of ideal compounds.

[C4]

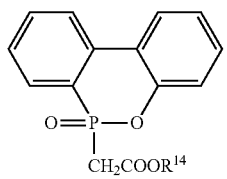

(a)

(In the formula, $R^{14}$ represents a hydrogen atom or a $C_{1-6}$ linear or branched alkyl group or alicyclic group).

[C5]

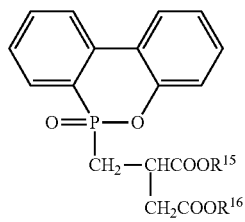

(b)

(In the formula, $R^{15}$ and $R^{16}$ may be the same or different, and each represents a hydrogen atom or a $C_{1-6}$ linear or branched alkyl group or alicyclic group).

[C6]

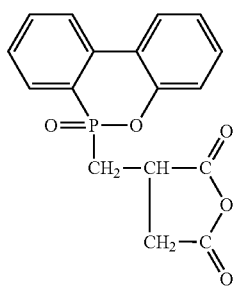

(c)

[C7]

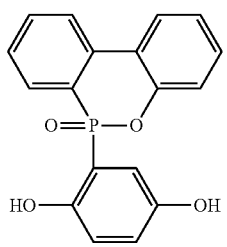

(d)

[C8]

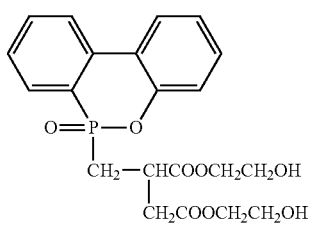

(e)

Of the compounds represented by General Formula (II) above, the compounds represented by chemical formulae (f) and (g) below are examples of especially desirable compounds.

[C9]

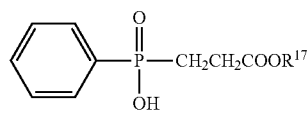

(f)

(In the formula, $R^{17}$ represents a hydrogen atom or a $C_{1-6}$ linear or branched alkyl group or alicyclic group).

[C10]

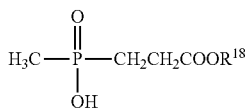

(g)

(In the formula, $R^{18}$ represents a hydrogen atom or a $C_{1-6}$ linear or branched alkyl group or alicyclic group).

Of the compounds represented by General Formula (III) above, the compounds represented by chemical formula (h) below are examples of especially desirable compounds.

[C11]

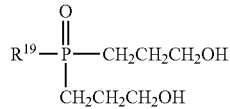

(h)

(In the formula, $R^{19}$ represents a hydrogen atom or a $C_{1-6}$ linear or branched alkyl group or alicyclic group).

When manufacturing the polyester resin, this reactive phosphorus-containing compound is preferably dissolved or dispersed in a univalent alcohol such as methanol or ethanol or a bivalent alcohol such as ethylene glycol, propylene glycol or butylene glycol before being added to the reaction system.

The content of phosphorus atoms derived from the reactive phosphorus-containing compound in the aqueous polyester resin is preferably adjusted to a weight ratio of 300 ppm or more relative to the total of the aqueous polyester resin, and a content of 500 ppm or more is more preferable. The amount of the reactive phosphorus-containing compound used is preferably adjusted so that the content of the phosphorus atoms in the aqueous polyester resin is within the aforementioned range. This serves to impart particularly good flame retardancy to the aqueous polyester resin. There is no particular upper limit to how much of this reactive phosphorus-containing compound is used, but the amount is preferably adjusted so that the content of phosphorus atoms is 100,000 ppm or less. This serves to prevent polymerization defects and the like, and prevent a loss of resin properties of the aqueous polyester resin.

The amounts of the raw materials used in manufacturing the polyester resin are preferably adjusted so that the molar ratio of the total of the carboxyl groups and ester-forming derivative groups thereof in the raw materials relative to the total of the hydroxyl groups and ester-forming derivative groups thereof is in the range of 1:1 to 1:2.5.

It is also desirable to use suitable amount of a known polyfunctional compound such as pentaerythritol, trimethylol propane, dimethylol butanoic acid or a trifunctional carboxylic acid in order to adjust the molecular weight when preparing the polyester resin. In particular, when the number of functional groups (ester-forming function groups) in the reactive phosphorus-containing compound is one, it is desirable to include this polyfunctional compound as needed because there is a risk that the reactive phosphorus-containing compound will act as a terminating agent.

In addition, p-hydroxybenzoic acid, univalent aliphatic alcohols and the like can also be combined as reaction components other than the above components.

The polyester resin can be produced by polymerization or condensation polymerization of the raw materials by a known polyester manufacturing method. For example, when the polyvalent carboxylic acid component is a polyvalent carboxylic acid and the glycol component is a glycol, a direct esterification reaction can be employed in which the polyvalent carboxylic acid and glycol are reacted in a single-stage reaction.

When the polyvalent carboxylic acid component is an ester-forming derivative of a polyvalent carboxylic acid and the glycol component is a glycol, on the other hand, the polyester resin can be manufactured via a first-stage reaction in which the ester-forming derivative of the polyvalent carboxylic acid is subjected to an ester exchange reaction with the glycol, and a second-stage reaction in which the reaction product of the first reaction is polycondensed. For example, using dimethyl terephthalate (DMT) as the polyvalent carboxylic acid component and ethylene glycol (EG) as the glycol component, bishydroxyethylene terephthalate (BHET) is first produced by an ester exchange reaction of DMT and EG (first-stage reaction), and this BHET is then polycondensed (second-stage reaction) to produce polyethylene terephthalate. In this case, components other than the polyvalent carboxylic acid component and glycol component are added and reacted at any timing from the beginning of the first reaction to the end of the second reaction.

Methods of manufacturing the polyester resin via the aforementioned first-stage reaction and second-stage reaction are here explained in more detail. In the first-stage reaction (ester exchange reaction), all the raw materials used in manufacturing the aqueous polyester resin can be included from the beginning in the reaction system, or else the reactive phosphorus-containing compound and the like may be added to the reaction system during the ester polycondensation reaction. When they are loaded all at once, the ester exchange reaction is accomplished for example by gradually heating from 150° C. to 260° C. under normal pressure in a nitrogen gas or other inactive gas atmosphere with the polyvalent carboxylic acid diester and glycol compound held in a reaction container.

The second-stage reaction (polycondensation reaction) is accomplished for example at a temperature range of 160° C. to 280° C. under reduced pressure of 6.7 hPa (5 mmHg) or less.

In this first-stage reaction and second-stage reaction, a conventionally known titanium, antimony, lead, zinc, magnesium, calcium, manganese or alkali metal compound or the like can be added as a catalyst to the reaction system at any timing.

When the polyester resin is to be used in preparing a resin composition for film formation, the number-average molecular weight of this polyester resin is preferably in the range of 5,000 to 50,000. A number-average molecular weight or 5,000 or more can give the polyester resin especially excellent durability and water resistance, and is also effective for improving hydrolysis resistance. If this number-average molecular weight is 50,000 or less, on the other hand, excellent solution stability can be maintained when the polyester resin is dispersed or dissolved in an aqueous solvent in the resin composition for film formation.

Moreover, when the polyester resin is to be used in preparing a resin composition for film formation, the intrinsic viscosity of this polyester resin is preferably in the range of 0.05 to 1.0. It is thus possible to impart excellent flame retardancy, durability and water resistance to the resin composition for film formation, and to improve the long-term storage stability of a dispersion or solution. That is, with an intrinsic viscosity of 0.05 or more it is possible to form an especially strong film from the resin composition for film formation, while with an intrinsic viscosity of 1.0 or less it is possible to obtain a liquid dispersion or solution with especially good long-term storage stability. Especially desirable effects are obtained if the intrinsic viscosity is in the range of 0.12 to 0.9. Moreover, optimal effects are obtained if the intrinsic viscosity is in the range of 0.2 to 0.9.

A hybrid-type polyester resin is obtained by preparing a reaction solution containing such a polyester resin together with silica particles and an alkoxysilane, and reacting the silica particles and alkoxysilane in the reaction solution by the sol-gel method.

A silica sol dispersed in water, an aqueous solvent, alcohol or the like can be used for the silica particles.

The average particle diameter of the silica particles is preferably 50 nm or less, or more preferably 20 nm or less. This allows for particular improvements in the flame retardancy of the hybrid-type polyester resin, while also maintaining the transparency of the hybrid-type polyester resin. There is no particular lower limit on the average particle diameter of the silica particles, but at least 4 nm or at least 5 nm is preferable from the standpoint of availability. The average particle diameter is a value measured by laser diffraction scattering using a particle size analyzer.

Alkoxysilanes are represented by the formula $R_nSiX_{4-n}$ in which each R independently represents an optionally substituted hydrocarbon group or phenyl group. Examples of R include methyl, ethyl, propyl, butyl, pentyl, hexyl, heptyl, octyl and other alkyl groups; cyclopentyl, cyclohexyl and other cycloalkyl groups; 2-phenylethyl, 2-phenylpropyl, 3-phenylpropyl and other aralkyl groups; phenyl, tolyl and other aryl groups; vinyl, allyl and other alkenyl groups; chloromethyl, γ-chloropropyl, 3,3,3-trifluoropropyl and other halogen-substituted hydrocarbon groups; and γ-methacryloxypropyl, γ-glycidoxypropyl, 3,4-epoxycyclohexylethyl, γ-mercaptopropyl and other substituted hydrocarbon groups. X represents an alkoxy group.

Moreover, n in the formula is preferably an integer from 0 to 3 or particularly an integer from 0 to 2, or in other words the alkoxysilane is a tetrafunctional, trifunctional or bifunctional alkoxysilane. Examples of tetrafunctional alkoxysilanes include tetramethoxysilane, tetraethoxysilane and the like. Examples of trifunctional alkoxysilanes include methyl trimethoxysilane, methyl triethoxysilane, methyl triisopropoxysilane, propyltrimethoxysilane, phenyl trimethoxysilane, phenyl triethoxysilane, 3,3,3-trifluoropropyl trimethoxysilane and the like. Examples of bifunctional alkoxysilanes include dimethyl dimethoxysilane, dimethyl diethoxysilane, diphenyl dimethoxysilane, diphenyl diethoxysilane, methyl phenyl dimethoxysilane and the like.

Water or a mixed solvent containing water and another solvent can be used as the solvent in the reaction solution. Examples of other solvents include toluene, xylene, hexane, ethyl heptaneacetate, butyl acetate, methyl ethyl ketone, methyl isobutyl ketone, methyl ethyl ketoxime and the like.

The contents of the polyester resin, silica particles and alkoxysilane in the reaction solution can be set appropriately, but preferably the content of the polyester resin is in the range of 1 mass % to 50 mass %, the content of the silica particles is in the range of 1 mass % to 60 mass % of the polyester resin, and the content of the alkoxysilane is in the range of 0.3 mass % to 20 mass % of the polyester resin. In this way is possible to control gelling and maintain the stability of the reaction solution, while the effects of improving the flame retardancy of the hybrid-type polyester resin and preventing scattering of high-temperature droplets during combustion are also increased. If the silica or alkoxysilane content is excessive, the stability of the reaction solution is reduced and there is a risk of gelling, while if the alkoxysilane content is too low, there may not be sufficient improvement in the flame retardancy of the hybrid-type polyester resin, and if the silica content is too low, a sufficient high-temperature droplet scattering prevention effect may not be achieved.

A catalyst is preferably compounded in the reaction solution. This catalyst may be an acid catalyst or a basic catalyst. Examples of acid catalysts include organic acids such as acetic acid, chloroacetic acid, citric acid, benzoic acid, dimethylmalonic acid, formic acid, propionic acid, glutaric acid, glycolic acid, maleic acid, malonic acid, toluenesulfonic acid and oxalic acid; inorganic acids such as hydrochloric acid, nitric acid, halogenated silane and the like; and acidic sol fillers such as acidic colloidal silica and acidic titania sol and the like. Examples of basic catalysts include aqueous solutions of sodium hydroxide, calcium hydroxide and other hydroxides of alkali metals or alkali earth metals; and ammonia water, aqueous amine solutions and the like. One of these catalysts may be used alone, or two or more kinds may be used together.

A phosphorus flame retardant may also be included in the reaction solution. In this case, the flame retardancy of the hybrid-type polyester resin can be improved because the phosphorus flame retardant is mixed into the hybrid-type polyester resin.

Examples of the phosphorus flame retardant include butyl bis(3-hydroxypropyl)phosphine oxide, ammonium polyphosphate and other polyphosphate salts, and guanidine phosphate derivatives and the like.

It is desirable to use the reactive phosphorus-containing compound described above as the phosphorus flame retardant. This serves to further improve the flame retardancy of the hybrid-type polyester resin.

When such a phosphorus flame retardant is used, it is preferably used in the amount of 1 mass % to 40 mass % of the polyester resin.

Promoting a sol-gel reaction of the alkoxysilane and silica particles in the reaction solution serves to hybridize the siloxane produced by the reaction with the polyester resin. The sol-gel reaction may be performed at room temperature, or with heating of the reaction solution. For example, the sol-gel reaction may be performed with the temperature of the reaction solution at 10° C. to 90° C., or preferably 20° C. to 80° C., or more preferably 30° C. to 60° C. The reaction time depends partly on the reaction temperature, but may be in the range of 1 hour to 48 hours for example.

The hybrid-type polyester resin produced by thus hybridizing the polyester resin and siloxane acquires excellent flame retardancy and also the property of being less likely to scatter high-temperature droplets even when it burns, while maintaining the excellent properties inherent in polyester resin. Furthermore, the flame retardancy of the hybrid-type polyester resin can be further improved by using a phosphorus-containing polyester resin, or including a phosphorus flame retardant in the reaction solution. In addition, excellent water dispersibility or water solubility can be imparted to the hybrid-type polyester resin by using a hydrophilic component as a raw material of the polyester.

This hybrid-type polyester resin can be used for various applications. In particular, as discussed above, because of its excellent durability and the like this hybrid-type polyester resin can be used favorably in preparing a resin composition for film formation.

When the hybrid-type polyester resin has been given excellent water dispersibility or solubility, the resin composition for film formation can be applied as a water-based composition, and excellent worker safety and environmental protection are obtained when a base material is processed using this resin composition for film formation. Penetrating agents, flame retardants, anti-static agents, pigments, dyes, antioxidants, UV absorbents, antifoaming agents, dispersion aids and other additives can also be included as necessary in this resin composition for film formation.

When the resin composition for film formation is used to treat textile products, examples of treatment methods include methods in which the resin composition for film formation is applied to a woven, knitted or nonwoven textile or carpet, web or the like by immersion, padding, coating or the like, methods in which the resin composition for film formation is applied to the threads with a sizing machine as in a sizing method, and methods in which such treated threads are then woven and the like.

When the resin composition for film formation is used to surface-treat a polyester film of a PET film, the method of use may be a method in which the resin composition for film formation is applied for example to the manufactured PET film ex post. In other methods, the resin composition for film formation is applied to the surface of the polyester film at any stage in the process of forming a PET or other polyester film by ordinary methods. In the latter case, PET film formation may involve various steps including drying, melt extrusion, unstretched film formation, biaxial stretching and heat treatment for example, and the resin composition for film formation can be applied to the film by dipping, curtain coating, gravure coating, wire bar methods, spray coating, reverse coating, die coating or the like during any of these steps.

In addition to the applications given above, a resin composition for film formation containing the hybrid-type polyester resin may be applied, for example, as a coating agent for metal, glass, paper, wood and the like, as an overcoat agent for electronic substrates and the like, as an anchor coat agent, ink binder or other adhesive agent, and as a surface treatment agent for polyvinyl chloride, polycarbonate and other plastic films and the like.

A polyester film, textile or the like that is surface-treated with the resin composition for film formation thereby acquires superior flame retardancy, and the hybrid-type polyester resin on the surface does not break down easily or scatter high-temperature droplets even if it is burned during a fire or the like. Thus, the spread of damage can be controlled during a fire or the like.

EXAMPLES

The present invention is explained in more detail below using example. The "parts" and "%" values used below are all based on mass unless otherwise specified.

Synthesis Example 1

135.9 parts of dimethylterephthalic acid, 35.0 parts of dimethylisophthalic acid, 35.5 parts of sodium 5-sulfonate dimethylisophthalic acid, 124.2 parts of ethylene glycol and 0.1 part of titanium potassium oxalate as a catalyst were added to a reaction container to prepare a reaction solution, which was then heated to 200° C. with agitation at normal pressure in a nitrogen atmosphere. Next, the reaction temperature was gradually raised to 260° C. over the course of 4 hours to terminate the ester exchange reaction. This was then gradually depressurized at 260° C., and a polycondensation reaction was performed for 2 hours under conditions of 260° C., 0.67 hPa (0.5 mmHg) to produce an aqueous polyester resin with an intrinsic viscosity of 0.60 and a number-average molecular weight of 27,000.

25 parts of this polyester resin and 75 parts of water were added to a dissolving bath, and dissolved with agitation for 2 hours at a temperature of 80° C. to 95° C. to obtain 25% aqueous solution A of polyester resin.

Synthesis Example 2

In Synthesis Example 1, the amount of the dimethylisophthalic acid used was changed to 44.7 parts, the amount of the sodium 5-sulfonate dimethylisophthalic acid used was changed to 29.6 parts, and the amount of the ethylene glycol used was changed to 116.8 parts in the preparation of the reaction solution. In addition, 12.7 parts of diethylene glycol were further added to the reaction solution. An aqueous polyester resin with an intrinsic viscosity of 0.57 and a number-average molecular weight of 25,000 was obtained under the same conditions as in Synthesis Example 1 with these exceptions.

25 parts of this polyester resin, 70 parts of water and 5 parts of ethylene glycol mono-t-butyl ether were added to a dissolving bath, and dissolved with agitation for 2 hours at a temperature of 80° C. to 95° C. to obtain 25% aqueous solution B of polyester resin.

Synthesis Example 3

In Synthesis Example 1, the amount of the dimethylterephthalic acid used was changed to 48.6 parts, the amount of the dimethylisophthalic acid used was changed to 46.6 parts, the amount of the sodium 5-sulfonate dimethylisophthalic acid used was changed to 17.8 parts, and the amount of the ethylene glycol used was changed to 195.3 parts in the preparation of the reaction solution. In addition, 12.7 parts of diethylene glycol, 115.5 parts of the reactive phosphorus-containing compound represented by chemical formula (e) above and 2.7 parts of trimethylol propane were further added to the reaction solution. An aqueous polyester resin with an intrinsic viscosity of 0.50 and a number-average molecular weight of 12,000 was obtained under the same conditions as in Synthesis Example 1 with these exceptions.

25 parts of this polyester resin, 70 parts of water and 10 parts of ethylene glycol mono-t-butyl ether were added to a dissolving bath, and dissolved with agitation for 2 hours at a temperature of 80° C. to 95° C. to obtain 25% aqueous solution C of polyester resin.

Example 1

100 parts of the polyester aqueous solution A obtained in Synthesis Example 1 above, 50 parts of water, 50 parts of methanol, 10 parts of colloidal silica (30% aqueous solution), 5 parts of ammonium polyphosphate, 0.1 parts of tetraethoxysilane and 0.3 parts of 25% ammonia water were placed in a reaction container, and reacted for 5 hours at 25° C., 500 rpm. The methanol and the alcohol produced by the reaction were then distilled off under reduced pressure to obtain an aqueous solution of a hybrid-type polyester resin.

Example 2

In Example 1, the amount of tetraethoxysilane used was changed to 1 part. An aqueous solution of a hybrid-type polyester resin was obtained under the same conditions as in Example 1 with this exception.

Example 3

In Example 1, the amount of tetraethoxysilane used was changed to 5 parts. An aqueous solution of a hybrid-type polyester resin was obtained under the same conditions as in Example 1 with this exception.

Example 4

In Example 1, the polyester aqueous solution B synthesized in Synthesis Example 2 above was used instead of polyester aqueous solution A, IPA silica sol (solids content 30%) was used instead of colloidal silica (30% aqueous solution), the amount of ammonium polyphosphate used was changed to 10 parts, and the amount of tetraethoxysilane used was changed to 0.5 parts. An aqueous solution of a hybrid-type polyester resin was obtained under the same conditions as in Example 1 with these exceptions.

Example 5

In Example 4, propyl trimethoxysilane was used instead of tetraethoxysilane, and the amount of ammonium polyphosphate used was changed to 5 parts. An aqueous solution of a hybrid-type polyester resin was obtained under the same conditions as in Example 4 with these exceptions.

Example 6

In Example 4, dimethyl diethoxysilane was used instead of tetraethoxysilane, and the amount of ammonium polyphosphate used was changed to 1 part. An aqueous solution of a hybrid-type polyester resin was obtained under the same conditions as in Example 4 with these exceptions.

Example 7

In Example 4, butyl bis(3-hydroxypropyl)phosphine oxide was used instead of ammonium polyphosphate. An aqueous solution of a hybrid-type polyester resin was obtained under the same conditions as in Example 4 with this exception.

Example 8

In Example 5, butyl bis(3-hydroxypropyl)phosphine oxide was used instead of ammonium polyphosphate. An aqueous solution of a hybrid-type polyester resin was obtained under the same conditions as in Example 5 with this exception.

Example 9

In Example 6, butyl bis(3-hydroxypropyl)phosphine oxide was used instead of ammonium polyphosphate. An aqueous solution of a hybrid-type polyester resin was obtained under the same conditions as in Example 6 with this exception.

Example 10

In Example 7, the amount of IPA silica gel used was changed to 1 part, and the amount of butyl bis(3-hydroxypropyl)phosphine oxide used was changed to 5 parts. An aqueous solution of a hybrid-type polyester resin was obtained under the same conditions as in Example 7 with these exceptions.

Example 11

In Example 10, the amount of IPA silica gel used was changed to 50 parts. An aqueous solution of a hybrid-type polyester resin was obtained under the same conditions as in Example 10 with this exception.

Example 12

In Example 10, HCA-HQ (the reactive phosphorus-containing compound (d) represented by chemical formula (d) above) was used instead of butyl bis(3-hydroxypropyl)phosphine oxide, and the amount of IPA silica sol used was changed to 10 parts. An aqueous solution of a hybrid-type polyester resin was obtained under the same conditions as in Example 10 with these exceptions.

Example 13

In Example 4, 1M HCl aqueous solution was used instead of 25% ammonia water. An aqueous solution of a hybrid-type polyester resin was obtained under the same conditions as in Example 4 with this exception.

Example 14

In Example 5, 1M HCl aqueous solution was used instead of 25% ammonia water. An aqueous solution of a hybrid-type polyester resin was obtained under the same conditions as in Example 5 with this exception.

Example 15

In Example 6, 1M HCl aqueous solution was used instead of 25% ammonia water. An aqueous solution of a hybrid-type polyester resin was obtained under the same conditions as in Example 6 with this exception.

Example 16

In Example 7, the polyester aqueous solution C synthesized in Synthesis Example 3 above was used instead of polyester aqueous solution B, methanol silica sol (solids content 30%) was used instead of IPA silica sol, and the amount of butyl bis(3-hydroxypropyl)phosphine oxide used was changed to 5 parts. An aqueous solution of a hybrid-type polyester resin was obtained under the same conditions as in Example 7 with these exceptions.

Example 17

In Example 16, propyl trimethoxysilane was used instead of tetraethoxysilane. An aqueous solution of a hybrid-type polyester resin was obtained under the same conditions as in Example 16 with this exception.

Example 18

In Example 16, dimethyl diethoxysilane was used instead of tetraethoxysilane. An aqueous solution of a hybrid-type polyester resin was obtained under the same conditions as in Example 16 with this exception.

Example 19

In Example 16, no butyl bis(3-hydroxypropyl)phosphine oxide was used. An aqueous solution of a hybrid-type polyester resin was obtained under the same conditions as in Example 16 with this exception.

Example 20

In Example 17, no butyl bis(3-hydroxypropyl)phosphine oxide was used. An aqueous solution of a hybrid-type polyester resin was obtained under the same conditions as in Example 17 with this exception.

Example 21

In Example 18, no butyl bis(3-hydroxypropyl)phosphine oxide was used. An aqueous solution of a hybrid-type polyester resin was obtained under the same conditions as in Example 18 with this exception.

Comparative Example 1

The polyester aqueous solution A synthesized in Synthesis Example 1 above was used as is.

Comparative Example 2

The polyester aqueous solution B synthesized in Synthesis Example 2 above was used as is.

Comparative Example 3

The polyester aqueous solution C synthesized in Synthesis Example 3 above was used as is.

Comparative Example 4

In Example 7, no tetraethoxysilane was used. An aqueous solution of a polyester resin was obtained under the same conditions as in Example 4 with this exception.

Comparative Example 5

In Example 7, no IPA silica sol was used. An aqueous solution of a polyester resin was obtained under the same conditions as in Example 4 with this exception.

Comparative Example 6

In Example 7, no tetraethoxysilane and butyl bis(3-hydroxypropyl)phosphine oxide were used. An aqueous solution of a polyester resin was obtained under the same conditions as in Example 4 with this exception.

Comparative Example 7

In Example 7, no tetraethoxysilane and IPA silica sol were used. An aqueous solution of a polyester resin was obtained under the same conditions as in Example 4 with this exception.

[Combustion Test]

Polyester tropical fabric was treated by the padding method using the hybrid-type polyester resin aqueous solutions obtained in the examples and the polyester resin aqueous solutions obtained in the comparative examples, dried for 5 minutes at 110° C., and cured for 1 minute at 180° C. to obtain test fabric.

This test fabric was subjected to combustion testing according to the 45° microburner method (JIS L 1091 A-1) and the contact flame method (JIS L 1091 D).

The results are shown in Table 1. According to these results, good evaluations were obtained for Examples 1 to 21 by both the A-1 method and the D method, and even when combustion occurred there was no dripping of high-temperature droplets.

TABLE 1

| | | | Examples | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| Raw material composition (parts) | Polyester resin 25% aqueous solution A | | 100 | 100 | 100 | | | | | | | | | | | | |
| | Polyester resin 25% aqueous solution B | | | | | 100 | 100 | 100 | 100 | 100 | 100 | 100 | 100 | 100 | 100 | 100 | 100 |
| | Polyester resin 25% aqueous solution C | | | | | | | | | | | | | | | | | |
| | Water | | 50 | 50 | 50 | 50 | 50 | 50 | 50 | 50 | 50 | 50 | 50 | 50 | 50 | 50 | 50 |
| | Methanol | | 50 | 50 | 50 | 50 | 50 | 50 | 50 | 50 | 50 | 50 | 50 | 50 | 50 | 50 | 50 |
| | Colloidal silica (30%) | | 10 | 10 | 10 | | | | | | | | | | | | | |
| | Methanol silica sol (30%) | | | | | | | | | | | | | | | | | |
| | IPA silica sol (30%) | | | | | 10 | 10 | 10 | 10 | 10 | 10 | 1 | 50 | 10 | 10 | 10 | 10 |
| | Butyl bis(3-hydroxypropyl)phosphine oxide | | | | | | | | 10 | 5 | 1 | 5 | 5 | | | | |
| | Ammonium polyphosphate | | 5 | 5 | 5 | 10 | 5 | 1 | | | | | | | 10 | 5 | 1 |
| | HCA-HQ | | | | | | | | | | | | | 5 | | | |
| | Dimethyl diethoxysilane | | | | | | 0.5 | | | 0.5 | | 0.5 | | | | | 0.5 |
| | Propyl trimethoxysilane | | | | | 0.5 | | 0.5 | | | | | | | | 0.5 | |
| | Tetraethoxysilane | | 0.1 | 1 | 5 | 0.5 | | | 0.5 | | | 0.5 | 0.5 | 0.5 | 0.5 | | |
| | 25% ammonia water | | 0.3 | 0.3 | 0.3 | 0.3 | 0.3 | 0.3 | 0.3 | 0.3 | 0.3 | 0.3 | 0.3 | 0.3 | | | |
| | 1M HCl aqueous solution | | | | | | | | | | | | | | 0.3 | 0.3 | 0.3 |
| Evaluation | A-1 method | Fractions | 3 | 3 | 3 | 3 | 3 | 3 | 3 | 3 | 3 | 3 | 3 | 3 | 3 | 3 | 3 |
| | | Dripping of droplets? | N | N | N | N | N | N | N | N | N | N | N | N | N | N | N |
| | D method | No. of flame contacts Vertical | 5 | 5 | 5 | 6 | 5 | 4 | 6 | 5 | 4 | 4 | 6 | 5 | 6 | 5 | 4 |
| | | Horizontal | 5 | 5 | 5 | 6 | 5 | 4 | 6 | 5 | 4 | 4 | 6 | 5 | 6 | 5 | 4 |
| | | Dripping of droplets? | N | N | N | N | N | N | N | N | N | N | N | N | N | N | N |

| | | | Examples | | | | | | Comp. Examples | | | | | | |
|---|---|---|---|---|---|---|---|---|---|---|---|---|---|---|---|
| | | | 16 | 17 | 18 | 19 | 20 | 21 | 1 | 2 | 3 | 4 | 5 | 6 | 7 |
| Raw material composition (parts) | Polyester resin 25% aqueous solution A | | | | | | | | 100 | | | | | | |
| | Polyester resin 25% aqueous solution E | | | | | | | | | 100 | | 100 | 100 | 100 | 100 |
| | Polyester resin 25% aqueous solution C | | 100 | 100 | 100 | 100 | 100 | 100 | | 100 | | | | | |
| | Water | | 50 | 50 | 50 | 50 | 50 | 50 | | | | 50 | 50 | 50 | 50 |
| | Methanol | | 50 | 50 | 50 | 50 | 50 | 50 | | | | 50 | 50 | 50 | 50 |
| | Colloidal silica (30%) | | | | | | | | | | | | | | |
| | Methanol silica sol (30%) | | 10 | 10 | 10 | 10 | 10 | 10 | | | | | | | |
| | IPA silica sol (30%) | | | | | | | | | | | 10 | | 10 | |
| | Butyl bis(3-hydroxypropyl)phosphine oxide | | 5 | 5 | 5 | | | | | | | 10 | 10 | | 10 |
| | Ammonium polyphosphate | | | | | | | | | | | | | | |
| | HCA-HQ | | | | | | | | | | | | | | |
| | Dimethyl diethoxysilane | | | | 0.5 | | 0.5 | | | | | | | | |
| | Propyl trimethoxysilane | | | 0.5 | | | 0.5 | | | | | | | | |
| | Tetraethoxysilane | | 0.5 | | | 0.5 | | | | | | | 0.5 | | |
| | 25% ammonia water | | 0.3 | 0.3 | 0.3 | 0.3 | 0.3 | 0.3 | | | | 0.3 | 0.3 | 0.3 | 0.3 |
| | 1M HCl aqueous solution | | | | | | | | | | | | | | |

TABLE 1-continued

| Evaluation | A-1 method | Fractions | 3 | 3 | 3 | 3 | 3 | 3 | 1 | 1 | 3 | 1 | 3 | 1 | 3 |
|---|---|---|---|---|---|---|---|---|---|---|---|---|---|---|---|
| | | Dripping of droplets? | N | N | N | N | N | N | Y | Y | Y | N | Y | N | Y |
| | D method | No. of flame contacts Vertical | 6 | 6 | 6 | 5 | 5 | 5 | 1 | 1 | 4 | 5 | 4 | 3 | 4 |
| | | Horizontal | 6 | 6 | 6 | 5 | 5 | 5 | 1 | 1 | 4 | 5 | 4 | 3 | 4 |
| | | Dripping of droplets? | N | N | N | N | N | N | Y | Y | Y | N | Y | N | Y |

The invention claimed is:

1. A manufacture method for a hybrid-type polyester resin, comprising a step of preparing a reaction solution comprising a polyester resin aqueous solution, silica particles and an alkoxysilane, and
forming the hybrid-type polyester resin by reacting the reaction solution by a sol-gel method, wherein:
a number-average molecular weight of the polyester resin is in a range of 5,000 to 50,000; and
the polyester resin contains a phosphorus-containing polyester resin.

2. The manufacture method for the hybrid-type polyester resin according to claim 1, wherein the phosphorus-containing polyester resin is formed from a polyvalent carboxylic acid component, a glycol component, a hydrophilic component and a reactive phosphorus-containing compound.

3. A manufacture method for a hybrid-type polyester resin, comprising a step of preparing a reaction solution comprising a polyester resin aqueous solution, silica particles and an alkoxysilane, and
forming the hybrid-type polyester resin by reacting the reaction solution by a sol-gel method, wherein:
a number-average molecular weight of the polyester resin is in a range of 5,000 to 50,000; and
a phosphorus flame retardant is placed in the reaction solution.

4. The manufacture method for the hybrid-type polyester resin according to claim 1, wherein the silica in the range of 1 mass % to 60 mass % and the alkoxysilane in the range of 0.3 mass % to 20 mass % are placed in the polyester resin, respectively.

5. The manufacture method for the hybrid-type polyester resin according to claim 1, wherein a phosphorus flame retardant is placed in the reaction solution.

6. The manufacture method for the hybrid-type polyester resin according to claim 3, wherein the silica in the range of 1 mass % to 60 mass % and the alkoxysilane in the range of 0.3 mass % to 20 mass % are placed in the polyester resin, respectively.

* * * * *